United States Patent [19]

Weitz et al.

[11] 4,119,665

[45] Oct. 10, 1978

[54] MANUFACTURE OF 6-AMINOCAPROAMIDE

[75] Inventors: Hans-Martin Weitz, Bad Durkheim; Rolf Fischer, Heidelberg; Franz Josef Broecker, Ludwigshafen, all of Fed. Rep. of Germany

[73] Assignee: BASF Aktiengesellschaft, Ludwigshafen, Fed. Rep. of Germany

[21] Appl. No.: 757,768

[22] Filed: Dec. 27, 1976

[30] Foreign Application Priority Data

Jan. 16, 1976 [DE] Fed. Rep. of Germany ....... 2601462

[51] Int. Cl.² ........................................ C07C 103/127
[52] U.S. Cl. .................................................. 260/561 A
[58] Field of Search ...................... 260/561 A, 583 K; 252/431 R, 466 J

[56] References Cited

U.S. PATENT DOCUMENTS

| | | | |
|---|---|---|---|
| 3,896,053 | 7/1975 | Broecker et al. | 252/466 J |
| 3,932,534 | 1/1976 | Fukunaga et al. | 260/583 K |
| 3,941,721 | 3/1976 | Broecker et al. | 252/466 J |
| 3,954,669 | 5/1976 | Broecker et al. | 252/431 R |

OTHER PUBLICATIONS

Wagner et al., Synthetic Organic Chemistry, John Wiley & Sons, N.Y., N.Y., 1955, pp. 568–569.
Durrant et al., Introduction to Advanced Inorganic Chem., John Wiley & Sons, N.Y., 1972, p. 400.

*Primary Examiner*—Allen B. Curtis
*Attorney, Agent, or Firm*—Keil, Thompson & Shurtleff

[57] ABSTRACT

A process for the manufacture of 6-aminocaproamide, wherein methyl or ethyl 5-cyanovalerate is reacted with excess ammonia at temperatures of from 25° to 200° C and the resulting 5-cyanovaleramide is hydrogenated at temperatures of from 25° to 200° C and pressures of from 50 to 300 bars in the presence of ammonia and of supported cobalt and/or nickel catalysts. 6-Aminocaproamide is suitable for the manufacture of caprolactam.

7 Claims, No Drawings

MANUFACTURE OF 6-AMINOCAPROAMIDE

The present invention relates to a process for the manufacture of 6-aminocaproamide from methyl or ethyl-5-cyanovalerate.

J. Amer. Chem. Soc., 68 (1946) 1684 discloses that 6-aminocaproamide may be obtained by reacting ethyl 6-aminocaproate with ammonia. The yields obtained of 63% are unsatisfactory, however, and are no incentive for carrying out the process on a large scale.

It is an object of the invention to manufacture 6-aminocaproamide in high yields and in a simple manner starting from readily available compounds.

We have found that this object is achieved if methyl or ethyl 5-cyanovalerate is reacted with excess ammonia at a temperature of from 25° to 200° C and the resulting 5-cyanovaleramide is hydrogenated at a temperature of from 25° to 200° C and a pressure of from 50 to 300 bars in the presence of ammonia and of supported cobalt and/or nickel catalysts obtained by calcination of compounds of formula I $$[(Mg_aNi(II)_bCo(II)_c)Al_2]CO_3(OH)_{16} \cdot 4\ H_2O \qquad I,$$

in which $b$ and $c$ denote integers or decimal numbers of from 0 to 6 and $a$ denotes an integer or decimal number of from 0 to 4, $2(a+b+c)$ being 12, at temperatures of from 200° to 600° C followed by reduction with hydrogen at elevated temperature.

Our novel process has the advantage that it gives higher yields. It also has the advantage that it uses more readily available starting materials. Methyl 5-cyanovalerate is readily available on an industrial scale starting from butadiene by the addition of hydrocyanic acid followed by the addition of CO to the pentenenitrile in the presence of methyl or ethyl alcohol and cobalt carbonyl catalysts.

We prefer to use methyl 5-cyanovalerate as starting material. The reaction is carried out using excess ammonia. Advantageously, from 10 to 40 and in particular from 10 to 20 moles of ammonia are used per mole of 5-cyanovalerate. The ammonia may be dissolved in an organic solvent or used in the form of an aqueous solution, but is preferably used in the anhydrous liquid state. The reaction proceeds at temperatures of from 25° to 200° C. Particularly good results are obtained at temperatures of from 50° to 150° C. The reaction is usually complete after from 2 to 6 hours. It will be appreciated that the reaction is carried out under autogenous pressure.

It is advantageous to use solvents. Suitable solvents are, for example, alkanols such as methanol and ethanol, and particularly the alcohol corresponding to the cyanovalerate used. Other suitable solvents are ethers such as dibutyl ether, tetrahydrofuran and dioxane.

Advantageously, the resulting reaction mixture is processed further without isolating the 5-cyanovaleramide, i.e. it is used whilst retaining the content of ammonia and solvents. Accordingly, it is possible, if desired, to simplify the process by adding the subsequently required hydrogenation catalysts to the first stage.

The hydrogenation is carried out at temperatures of from 25° to 200° C and in particular from 50° to 150° C. The pressure used is from 50 to 300 bars and preferably from 100 to 250 bars.

The hydrogenation is carried out in the presence of ammonia. As mentioned above, it is advantageous to use the ammonia introduced in the first stage, and this ammonia is consequently present in the reaction mixture in the amounts mentioned above. If the reaction in the first stage is carried out in the presence of solvents, these are advantageously also used in the hydrogenation stage, since the 5-cyanovaleramide is not isolated.

The hydrogenation is carried out in the presence of supported cobalt and/or nickel catalysts obtained by calcination of compounds of formula I, in which $b$ and $c$ denote integers or decimal numbers of from 0 to 6 and $a$ denotes an integer or decimal number of from 0 to 4, provided that $2(a+b+c) = 12$, at temperatures of from 200° to 600° C, followed by reduction with hydrogen at elevated temperature.

The compounds of formula I are produced as follows: Water-soluble salts of cobalt, nickel, magnesium and/or aluminum, e.g. chlorides, sulfates or preferably nitrates, are dissolved together in water in proportions as near as possible to the desired composition of the catalyst and in stoichiometric compliance with formula I. The metal ion content of this solution should, in all, be approximately 0.5 to 5 molar and advantageously 1.0 to 4 molar. The solution is heated to a temperature of from 50° to 100° C and preferably from 80° to 100° C and is combined, over from 0.5 to 10 and preferably from 1 to 3 minutes, with an equivalent amount or, preferably, a slight excess of a 1 to 5 and in particular 1.5 to 4 molar solution of an alkali metal bicarbonate heated at from 50° to 100° C and advantageously from 80° to 100° C. We prefer to use an excess of alkali metal bicarbonate equal to up to 20% by weight and in particular from 0.5 to 3% by weight of the theoretical amount of bicarbonate. After the addition of the metal salt solution, the mixture is stirred for from about 10 to 30 minutes and advantageously from 15 to 20 minutes, whereupon the resulting precipitate is filtered off, washed with water and dried at temperatures of from 50° to 200° C and preferably from 100° to 160° C. The hydroxy carbonates are obtained in approximately quantitative yields.

We prefer to start from the following compounds of formula I:

$Ni_6Al_2(OH)_{16}CO_3 \cdot 4\ H_2O$
$Ni_5MgAl_2(OH)_{16}CO_3 \cdot 4\ H_2O$
$Co_6Al_2(OH)_{16}CO_3 \cdot 4\ H_2O$
$Co_5MgAl_2(OH)_{16}CO_3 \cdot 4\ H_2O$ Calcination is advantageously carried out at temperatures of from 250° to 400° C over a period of, say, from 5 to 40 and in particular from 15 to 30 hours.

Prior to use, the catalysts are reduced using hydrogen over a period of, say, from 5 to 100 hours and in particular from 10 to 25 hours at preferred temperatures of from 180° to 500° C and in particular from 250° to 450° C.

The process may be carried out in both stages either batchwise or continuously using suitable equipment. The 6-aminocaproamide obtainable by the process of the invention is suitable for the manufacture of caprolactam.

The process of the invention is illustrated below with reference to the following Examples, in which the parts are by weight unless otherwise stated, the parts by weight relating to the parts by volume as do kilograms to liters.

EXAMPLE 1

Preparation of a Nickel Catalyst from Ni₆Al₂(OH)₁₆CO₃ · 4 H₂O

Two solutions are prepared to effect precipitation of $Ni_6Al_2(OH)_{16}CO_3 \cdot 4 H_2O$. The first solution contains 279.4 parts of $Ni(NO_3)_2 \cdot 6 H_2O$ and 120 parts of $Al(NO_3)_3 \cdot 9 H_2O$ dissolved in sufficient water to give a total solution of 640 parts by volume. The second solution is prepared by dissolving 159 parts of commercial soda in sufficient water to give a solution of 750 parts by volume. Sufficient water is placed in the precipitation vessel to allow the stirrer to operate. Both solutions and the water in the precipitation vessel are separately heated to 80° C. The water in said vessel is then adjusted to pH 8 with solution 2 with stirring. Precipitation is effected at 80° C and pH 8.0 by simultaneously feeding solutions 1 and 2 to the vessel. When precipitation is complete the mixture is stirred for a further 15 minutes at 80° C and the precipitate is then filtered off. It is then washed until no nitrate can be detected in the filtrate. The washed catalyst precursor $Ni_6Al_2(OH)_{16}CO_3 \cdot 4 H_2O$ is dried at 110° C and then calcined at 350° C. The calcined product is milled in a ball mill to a particle size of <100μ. The resulting oxidic catalyst powder is then reduced with hydrogen in a rotary kiln for 20 hours at 450° C. Following reduction, the pyrophoric catalyst is passed into an organic solvent such as an alcohol with the exclusion of air.

EXAMPLE 2

25 parts of methyl 5-cyanovalerate in 40 parts of methanol are heated to 120° C in a vibratory autoclave together with 24 parts of liquid ammonia and maintained at said temperature for 6 hours. After cooling and venting the autoclave, addition is made of 2.25 parts of a nickel catalyst (77% by weight of nickel) as prepared in Example 1, suspended in 24 parts of methanol. Ammonia and methanol lost during venting are replenished. The pressure is raised to a total pressure of 100 bars by pumping in hydrogen at room temperature. After heating to 80° C, the total pressure is 150 bars. Hydrogenation is continued with replenishment of the hydrogen until no further hydrogen is absorbed. After cooling and venting the autoclave, the reaction mixture is filtered to isolate the catalyst and the filtrate is evaporated to dryness. There are thus obtained 22.4 parts of 6-aminocaproamide (97% of theory), m.p. 49° to 50° C. The IR spectrum of this product and that of authentic 6-aminocaproamide are identical.

EXAMPLE 3

Preparation of a Cobalt Catalyst from Co₆Al₂(OH)₁₆CO₃ · 4 H₂O

Two solutions are prepared to effect precipitation of $Co_6Al_2(OH)_{16}CO_3 \cdot 4 H_2O$. The first solution contains 13.97 parts of $Co(NO_3)_2 \cdot 6 H_2O$ and 6.0 parts of $Al(NO_3)_3 \cdot 9 H_2O$ dissolved in sufficient water to give a total solution of 36 parts by volume. The second solution is prepared by dissolving 7.95 parts of commercial soda in water to give a total solution of 37.5 parts by volume. The two solutions are heated separately to 80° C. 10 parts by volume of water having a temperature of 80° C are placed in a stirred vessel. Solutions 1 and 2 are simultaneously fed to said vessel at a pH of 8 with stirring to effect precipitation of the catalyst precursor $Co_6Al_2(OH)_{16}CO_3 \cdot H_2O$. The pH is maintained constant by controlling the rates of feed. Precipitation is complete after about 60 minutes, whereupon stirring is continued for a further 15 minutes. The resulting precipitate is filtered off, washed free from nitrate and dried at 110° C. The dried product is calcined at 300° C for 7 hours. Prior to reduction, the calcined product is milled and sieved to give a particle size of less than 100μ. Prior to use, this oxidic powder is reduced in a kiln for 20 hours at 450° C using a gas mixture of about 95% by volume of nitrogen and 5% by volume of hydrogen. The catalyst is passed into an organic solvent such as an alcohol with the exclusion of air.

EXAMPLE 4

Example 1 is repeated except that 2.65 parts of a cobalt catalyst (77% by weight of cobalt) as prepared in Example 3 are used and hydrogenation is carried out at 120° C. The product is worked up to give 21.7 parts of 6-aminocaproamide (94% of theory).

We claim:

1. A process for the manufacture of 6-aminocaproamide which comprises reacting methyl or ethyl 5-cyanovalerate with excess ammonia at temperatures of from 25° to 200° C, contacting the resulting 5-cyanovaleramide at temperatures of from 25° to 200° C and pressures of from 50 to 300 bars in the presence of ammonia and of supported cobalt and/or nickel catalysts obtained by calcination of compounds of formula I $$[(Mg_aNi(II)_bCo(II)_c)Al_2]CO_3(OH)_{16} \cdot 4 H_2O \qquad I$$

in which $b$ and $c$ denote integers or decimal numbers of from 0 to 6 and $a$ denotes an integer or decimal number of from 0 to 4, $2(a+b+c)$ being 12, at temperatures of from 200° to 600° C, and subsequently reducing with hydrogen at elevated temperature.

2. A process as set forth in claim 1, wherein from 10 to 20 moles of liquid ammonia are used per mole of 5-cyanovalerate.

3. A process as set forth in claim 1, wherein a temperature of from 50° to 150° C is used during the reaction of 5-cyanovalerates with ammonia.

4. A process as set forth in claim 1, wherein a temperature of from 50° to 150° C is used during hydrogenation of 5-cyanovaleramide.

5. A process as set forth in claim 1, wherein pressures of from 100 to 250 bars are used during hydrogenation of 5-cyanovaleramide.

6. A process as set forth in claim 1, wherein catalysts are used which have been prepared from at least one of the following compounds:
Ni₆Al₂(OH)₁₆CO₃ · 4 H₂O
Ni₅MgAl₂(OH)₁₆CO₃ · 4 H₂O
Co₆Al₂(OH)₁₆CO₃ · 4 H₂O
Co₅MgAl₂(OH)₁₆CO₃ · 4 H₂O.

7. A process as set forth in claim 1, wherein methyl 5-cyanovalerate is used as starting material.

* * * * *